Dec. 17, 1957     R. LARAQUE     2,816,528
PISTON FOR A COMBUSTION ENGINE
Filed May 8, 1956

INVENTOR
ROLAND LARAQUE

BY *Kenway, Jenney,*
*Witter & Hildreth*

ATTORNEYS

United States Patent Office 2,816,528
Patented Dec. 17, 1957

2,816,528

PISTON FOR A COMBUSTION ENGINE

Roland Laraque, Paris, France

Application May 8, 1956, Serial No. 583,538

Claims priority, application France May 9, 1955

2 Claims. (Cl. 123—41.38)

The piston which forms the object of the invention is of the type which is subjected to high temperatures and which for this reason require an intensive cooling.

It is also of the type of piston in which the connecting rod is fixed in a rigid manner on the axis of the head of the rod, which is rotatably mounted in the piston.

The piston in accordance with the invention is characterised in that it is formed by two cylindrical members which are fitted one inside the other along a flat surface and a cylindrical surface, the internal member carrying the shaft of the head of the connecting rod, and the external member forming the head and the skirt of the piston, these two members being fixed with respect to each other by means of a stud projecting from the flat surface of one of the members in contact and passing into a corresponding cavity formed in the flat surface of the other member, and thus preventing any rotation, and by an open elastic ring of trapezoidal section in abutment against the extremity of the internal member and engaged in a circular groove of corresponding trapezoidal section in the skirt, this arrangement preventing any longitudinal displacement of the skirt.

In accordance with a further feature of the invention, an adequate circulation of a cooling liquid is created between the flat and cylindrical surfaces in contact by means of a continuous conduit system, every transverse section of which has a closed profile, one part of which belongs to one of the members and the other part to the other member.

There is described below, by way of example and without any implied limitation, one form of embodiment of a piston in accordance with the invention, illustrated in the attached drawings, in which.

Figure 1:
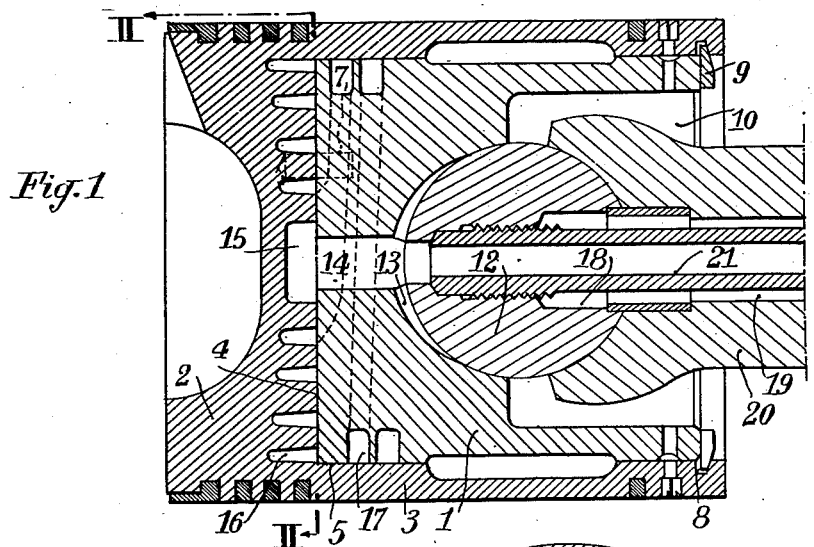
Fig. 1 is a cross-section along the axis of the piston.
Figure 2:
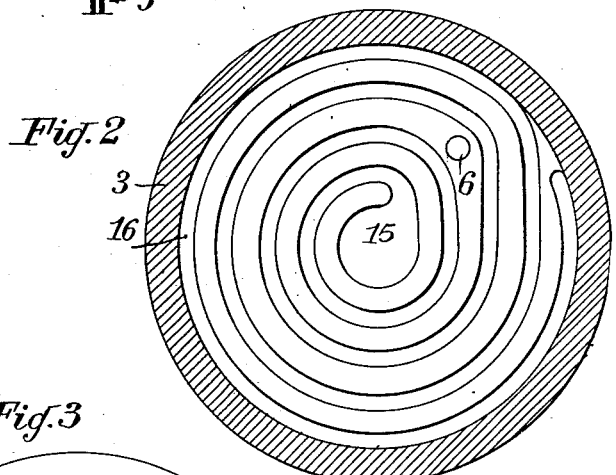
Fig. 2 is a view of the piston in cross-section, taken along the line II—II of Fig. 1.
Figure 3:
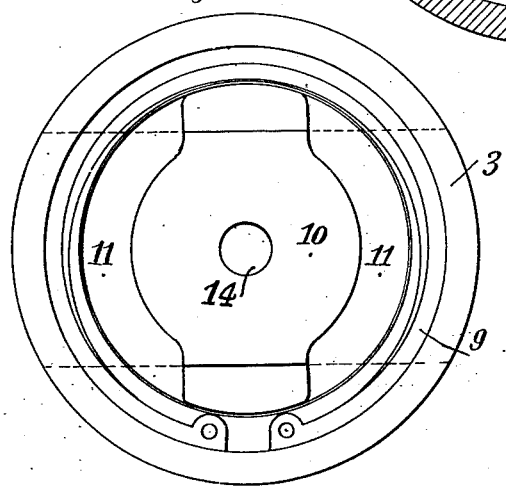
Fig. 3 is an end view looking on the side of the connecting rod, the rod and the bottom shaft of the rod being removed.

The internal member is shown at 1; the external member is formed by a head 2 and a skirt 3. The head 2 is fitted on the member 1 along the flat surface 4, and the skirt 3 fits the cylindrical surface 5 of the member 1. A stud 6, fixed in the head 2 and engaged in a corresponding cavity 7 in the head 1 prevents any rotation of the external member with respect to the internal member. At the extremity of the skirt 3 is formed an internal groove 8 having a trapezoidal profile. Against the flat external surface of the member 1 is applied an open elastic ring 9, the section of which is in the form of a wedge. This ring, the extremities of which have first of all been brought together so as to engage it in the bore of the skirt, then opens out to be engaged in the circular groove 8, and applies at the same time a pressure by its flat surface against the extremity of the member 1, and by its frusto-conical surface against the extremity of the skirt, thus preventing any longitudinal movement of the skirt.

The member 1 is provided with a cavity 10 between two lugs 11 which form bearings for the extremities of the shaft of the head of the connecting rod 12. In the cavity 10 is formed a substantially semi-cylindrical chamber which provides a passage to the head shaft of the connecting rod 12 and forms a space 13 which communicates with the flat face of the member 1 by an axial passage 14.

On the corresponding flat face of the piston head 2 is formed a chamber 15 which faces the passage 14; from this chamber is formed a groove 16 in the form of a spiral and a helicoidal groove 17 is cut in the cylindrical surface of the member 1, the groove 17 being connected to one extremity of the spiral groove 16. The other extremity of the helicoidal groove 17 communicates through the member 1 with one or a number of passages (not shown) with the bearings 11 of the head shaft of the connecting rod 12, from which it communicates by one or a number of passages (not shown) through this shaft with a chamber 18 formed in this shaft. Through this chamber and through a conduit 19 formed in the connecting rod 20, passes a tube 21 which is screwed at 22 into the shaft 12 and thus fixes the shaft rigidly to the connecting rod.

The cooling of the piston is effected as follows: the cooling liquid, coming in through the interior of the tube 21, spreads out in the chamber 13 and from thence through the passage 14 into the spiral 16, and then into the helicoidal groove 17 from which it arrives, after having thus adequately cooled the hottest parts of the piston, in the chamber 18 from which it is returned to the pump through the annular passage 19 of the connecting rod, and returns into the circuit after having passed through a radiator.

What I claim is:

1. A piston for a combustion engine comprising: an internal cylindrical member arranged at one end thereof so as to form the bearings of a head shaft of a connecting rod rigidly fixed to the said rod and having a circular top plate at its other end; a cylindrical casing fitted internally to the cylindrical surface of the said internal member and against the top of the said member; a helicoidal groove formed in the cylindrical wall of the said internal member, one extremity of the said groove communicating, through orifices formed in the said internal member, with the said bearings and the other extremity of which extends to the surface of contact of the said internal member with the bottom of the said casing; a spiral groove formed in the bottom of the said casing, one extremity of the said groove being connected with one extremity of the said helicoidal groove and the other extremity leading, through the top of the said internal member, into a cavity in the said member closed by the head shaft of the connecting rod, the said grooves and the said cavity forming a circuit for a lubricating fluid and for cooling the said piston, the extremities of the said circuit being connected through the head shaft of the connecting rod with longitudinal conduits formed in the said connecting rod.

2. A piston for a combustion engine in accordance with claim 1, in which the fixing together of the said internal member and the said casing is effected by means of a stud fixed in the bottom of said casing and engaged in a corresponding cavity in the top of said internal member, and by means of a trapezoidal ring applied against said one end of the internal member and engaged in a corresponding groove formed in the said casing.

References Cited in the file of this patent

FOREIGN PATENTS 103,058    Switzerland _____ Jan. 16, 1924